US009264411B2

(12) United States Patent
Guenther et al.

(10) Patent No.: US 9,264,411 B2
(45) Date of Patent: Feb. 16, 2016

(54) METHODS, APPARATUSES AND COMPUTER PROGRAM PRODUCT FOR USER EQUIPMENT AUTHORIZATION BASED ON MATCHING NETWORK ACCESS TECHNOLOGY SPECIFIC IDENTIFICATION INFORMATION

(75) Inventors: Christian Guenther, Neubiberg (DE); Dirk Kroeselberg, München (DE); Richard Wisenöcker, Vienna (AT)

(73) Assignee: Nokia Solutions and Networks Oy, Espoo (FI)

( * ) Notice: Subject to any disclaimer, the term of this patent is extended or adjusted under 35 U.S.C. 154(b) by 311 days.

(21) Appl. No.: 12/665,184

(22) PCT Filed: May 8, 2008

(86) PCT No.: PCT/EP2008/055711
§ 371 (c)(1),
(2), (4) Date: Dec. 17, 2009

(87) PCT Pub. No.: WO2008/155168
PCT Pub. Date: Dec. 24, 2008

(65) Prior Publication Data
US 2010/0182985 A1   Jul. 22, 2010

(30) Foreign Application Priority Data
Jun. 18, 2007   (EP) .................................... 07110492

(51) Int. Cl.
*H04W 4/00* (2009.01)
*H04L 29/06* (2006.01)
(Continued)

(52) U.S. Cl.
CPC .......... *H04L 63/08* (2013.01); *H04L 29/12188* (2013.01); *H04L 61/1588* (2013.01); *H04W 12/06* (2013.01); *H04L 65/1016* (2013.01); *H04W 80/10* (2013.01); *H04W 84/12* (2013.01)

(58) Field of Classification Search
CPC ..... H04L 65/1016; H04L 63/08; H04L 12/14; H04L 61/1588; H04W 12/06; H04W 60/00; H04W 60/04; H04W 8/26; H04W 8/04; H04W 4/00
USPC ........ 455/435.1, 433, 411, 416, 432.1, 404.1, 455/410; 370/352, 338, 329, 230, 401, 328; 380/270; 709/225
See application file for complete search history.

(56) References Cited

U.S. PATENT DOCUMENTS 5,901,284 A * 5/1999 Hamdy-Swink ...... H04L 29/069
                                                      340/5.74
7,065,067 B2 * 6/2006 Song ....................... H04L 63/08
                                                      370/338

(Continued)

OTHER PUBLICATIONS

3GPP TR 33.978 V6.5.0 (Sep. 2006), 3rd Generation Partnership Project; Technical Specification Group Services and System Aspects; Security aspects of early IP Multimedia Subsystem (IMS) (Release 6), 27 pgs.

(Continued)

*Primary Examiner* — Mahendra Patel
(74) *Attorney, Agent, or Firm* — Harrington & Smith

(57) ABSTRACT

It is disclosed a method including providing a relation of network access technology-specific identification information (NATSII) of a user equipment or user and network identity-related information (NIRI) of the user equipment, receiving an inquiry comprising network identity-related inquiry information (NIRII), resolving the received NIRII based on the provided relation, and sending a response including the NATSII according to a result of the resolved NIRII; a method including receiving a registration request comprising NIRII from a user equipment or user, obtaining NATSII based on the received NIRII, appending the received NIRII with the obtained NATSII, and sending the appended NIRII; and a method including receiving a registration request comprising first NATSII and NIRI, obtaining second NATSII based on the received NIRI, matching the received first NATSII against the obtained second NATSII, and authorizing access for a user equipment based on a result of matching.

27 Claims, 7 Drawing Sheets

(51) Int. Cl.
*H04L 29/12* (2006.01)
*H04W 12/06* (2009.01)
*H04W 80/10* (2009.01)
*H04W 84/12* (2009.01)

(56) References Cited

U.S. PATENT DOCUMENTS

| | | | | |
|---|---|---|---|---|
| 2003/0154400 | A1* | 8/2003 | Pirttimaa | H04L 29/06 726/14 |
| 2005/0202812 | A1* | 9/2005 | Minamida et al. | 455/432.1 |
| 2006/0019635 | A1* | 1/2006 | Ollila et al. | 455/411 |
| 2006/0090068 | A1* | 4/2006 | Andersen et al. | H04L 12/14 713/160 |
| 2006/0146797 | A1* | 7/2006 | Lebizay | 370/352 |
| 2007/0287419 | A1* | 12/2007 | Wang | 455/411 |
| 2008/0182614 | A1* | 7/2008 | Cormier et al. | 455/552.1 |
| 2008/0198845 | A1* | 8/2008 | Boman | 370/389 |
| 2008/0311888 | A1* | 12/2008 | Ku et al. | 455/414.1 |

OTHER PUBLICATIONS

"Universal Mobile Telecommunications System (UMTS); Security aspects of early IP Multimedia Subsystem (IMS) (3GPP TR33.978 version 6.5.0 Release 6)", ETSI TR 133 978 V6.5.0 (Sep. 2006), 28 pgs.

3GPP TS 23.234 V6.10.0 (Sep. 2006), $3^{rd}$ Generation Partnership Project; Technical Specification Group Services and System Aspects, 3GPP system to Wireless Local Area Network 9WLAN) interworking; System description (Release 6), 75 pgs.

3GPP TS 33.203 V7.4.0 (Dec. 2006), $3^{rd}$ Generation Partnership Project; Technical Specification Group Services and System Aspects; 3G security; Access security for IP-based services (Release 7), 65 pgs.

3GPP TR 33.878 V1.0.0 (Dec. 2004) Technical Report $3^{rd}$ Generation Partnership Project; Technical Specification Group Services and System Aspects; Security Aspects of Early IMS (Release 6).

3GPP TR 33.978 V6.6.0 (Dec. 2006) Technical Report $3^{rd}$ Generation Partnership Project Technical Specification Group Services and System Aspects; Security aspects of early IP Multimedia Subsystem (IMS) (Release 6).

* cited by examiner

333# METHODS, APPARATUSES AND COMPUTER PROGRAM PRODUCT FOR USER EQUIPMENT AUTHORIZATION BASED ON MATCHING NETWORK ACCESS TECHNOLOGY SPECIFIC IDENTIFICATION INFORMATION

FIELD OF THE INVENTION

The present invention relates to UE (user equipment) or user authorization e.g. in WiMAX (Worldwide Interoperability for Microwave Access) networks and the interworking with IMS (IP (Internet Protocol) Multimedia Subsystem) networks. More specifically, the present invention relates to methods, apparatuses, a system and a related computer program product by means of which e.g. user equipment such as WiMAX mobile stations (WiMAX terminal devices on the user side) or WiMAX stationary terminal devices may be authorized to access e.g. IMS services over a WiMAX network.

BACKGROUND

In 3GPP (3$^{rd}$ Generation Partnership Project) and the WiMAX Forum, there have been discussions related to user equipment authorization.

Namely, WiMAX networks have been specified by the WiMAX Forum Networking Group (NWG). These WiMAX networks provide e.g. broadband IP connectivity to mobile stations via an air interface as defined e.g. by the IEEE (Institute of Electrical and Electronics Engineers) 802.16e-2005 standard. The IMS is a multi-media architecture for both mobile and fixed-line IP services. Originally, the IMS has been defined by 3GPP, and was largely adopted e.g. by 3GPP2 (Third Generation Partnership Project 2) or by ETSI (European Telecommunications Standards Institute) TISPAN (Telecoms and Internet Converged Services and Protocols for Advanced Network).

For example, FIG. 1 shows a method for access authorization to IMS services as specified e.g. by 3GPP TS (Technical Specification) 33.203. The methods defined by TS 33.203 are based on the requirement that a UICC (Universal Integrated Circuit Card) is inserted into the UE. Generally put, an ISIM (IMS Services Identity Module, an application running on the UICC) and the IMS HN (Home Network) of the ISIM authenticate each other based on a long-term key being secretly shared by both ISIM and HN.

As shown in FIG. 1, a communication system 100 comprises a UE 101 and a network 102. The network 102 in turn comprises a P-CSCF (Proxy Call Session Control Function) 1021, an I-CSCF (Interrogating CSCF) 1022, an S-CSCF (Serving CSCF) 1023 and a HSS (Home Subscriber Server) 1024. Signalling between elements is indicated in horizontal direction, while time aspects between signalling are reflected in the vertical arrangement of the signalling sequence as well as in the sequence numbers.

The message flow as shown in FIG. 1 depicts the IMS access authorization procedure as defined e.g. by TS 33.203. This procedure is commonly referred to as IMS-AKA (Authentication and Key Agreement).

In step S1, a SIP (Session Initiation Protocol) REGISTER request is sent from the UE 101 to the P-CSCF 1021. This request contains the domain name <HN> of the Home Network as read from the ISIM of the UE 101, the subscriber's private and public IMS identities <IMPI> and <IMPU>, as well as the IP address (obtained prior to IMS AKA) of the UE 101. Besides the IP address, all these data are read from the ISIM.

In step S2, the SIP REGISTER request is sent from the P-CSCF 1021 to the I-CSCF 1022. The P-CSCF 1021 resolves the address of the I-CSCF 1022 in the HN and forwards the identities IMPI, IMPU and the IP address received in step S1 to the I-CSCF 1022 of the HN.

In step S3, the SIP REGISTER request is sent from the I-CSCF 1022 to the S-CSCF 1023. The I-CSCF 1022 in turn forwards these identities IMPI, IMPU and the IP address to the S-CSCF 1023 serving this request.

In step S4, a MAR (Multimedia Access Request) is sent from the S-CSCF 1023 to the HSS 1024. In this MAR, the S-CSCF 1023 requests authentication data from the HSS with respect to the IMS subscriber identified by <IMPI>.

In step S5, a MAA (Multimedia Access Answer) is sent from the HSS 1024 to the S-CSCF 1023. The HSS 1024 sends an Authentication Vector (AV) to the S-CSCF 1023 containing the following types of data: random challenge RAND, expected answer XRES, network authentication token AUTN that contains a message integrity code MAC, integrity key IK, and ciphering key CK.

In step S6, a SIP Unauthorized 401 message is sent from the S-CSCF 1023 to the I-CSCF 1022. At this point in time, the S-CSCF 1023 denies the UE authentication. Instead, the S-CSCF 1023 sends the SIP Unauthorized message with a WWW-Authenticate header to the I-CSCF 1022. This header contains RAND, AUTN, IK and CK. The value XRES, however, is held back by the S-CSCF 1023.

In step S7, a SIP Unauthorized 401 message is sent from the I-CSCF 1022 to the P-CSCF 1021. The I-CSCF 1022 forwards RAND, AUTN, IK and CK to the P-CSCF 1021 as received in the previous step S6.

In step S8, a SIP Unauthorized 401 message is sent from the P-CSCF 1021 to the UE 101. The P-CSCF 1021 sends RAND and AUTN to the UE 101, i.e., the P-CSCF 1021 does not forward IK and CK to the UE 101, but stores IK and CK for later use.

In step S9, a SIP REGISTER request is sent from the UE 101 to the P-CSCF 1021. The ISIM of the UE 101 computes the value RES by means of input of its version of the secret key K. Then, the UE 101 sends a new SIP REGISTER request to the P-CSCF 1021, this time alongside with RES as response to the challenge initiated by the S-CSCF 1023 in step S6. This SIP REGISTER request is protected by IPSec (Internet Protocol Security) (integrity protection mandatory, encryption depends on UE 101 and P-CSCF 1021 capabilities and P-CSCF 1021 policy). To this end, the UE 101 has calculated the keys IK and CK on input of RAND and the secret key K.

In step S10, a SIP REGISTER request is sent from the P-CSCF 1021 to the I-CSCF 1022. The P-CSCF 1021 forwards RES to the I-CSCF 1022.

In step S11, a SIP REGISTER request is sent from the I-CSCF 1022 to the S-CSCF 1023. The I-CSCF 1022 forwards RES to the S-CSCF 1023.

In step S12, in case of success, a SIP message OK 200 is sent from the S-CSCF 1023 to the I-CSCF 1022. That is, in case RES equals XRES, the S-CSCF 1023 considers the subscriber (i.e. the UE 101) authenticated, and binds <IMPU> to the IP address <IP address>. The S-CSCF 1023 informs the I-CSCF 1022 about this decision.

In step S13, a SIP message OK 200 is sent from the I-CSCF 1022 to the P-CSCF 1021. That is, the I-CSCF 1022 forwards the SIP message OK 200 to the P-CSCF 1021.

Finally, in step S14, a SIP message OK 200 is sent from the P-CSCF 1021 to the UE 101. That is, the P-CSCF 1021 forwards the SIP message OK 200 to the UE 101. This message is also protected by means of IPSec.

As an alternative, TS 33.203 also defines a slight variant of IMS-AKA that is suitable for UICCs without an ISIM, but in that case, an USIM (UMTS (Universal Mobile Telecommunications System) Subscriber Identity Module) application is running on the UICC of the UE 101. However, also in that variant, a UICC must be present in the UE 101.

According to the above, a problem is related to the issue of how to authorize WiMAX Mobile Stations to access IMS services without mandating a UICC to be inserted into the MS/UE.

In consideration of the above, it is an object of the present invention to overcome one or more of the above drawbacks. In particular, the present invention provides methods, apparatuses, a system and a related computer program product for user equipment or user authorization.

According to the present invention, in a first aspect, this object is for example achieved by a method comprising:

providing a relation of network access technology-specific identification information of a user equipment or user and network identity-related information of the user equipment;

receiving an inquiry comprising network identity-related inquiry information;

resolving the received network identity-related inquiry information based on the provided relation; and sending a response comprising the network access technology-specific identification information according to a result of the resolved network identity-related inquiry information.

According to further refinements of the invention as defined under the above first aspect, the network identity-related information and the network identity-related inquiry information respectively comprise an internet protocol address allocated to the user equipment;

the network identity-related information and the network identity-related inquiry information respectively comprise an internet protocol multimedia subsystem private identity and an internet protocol multimedia subsystem public identity.

According to the present invention, in a second aspect, this object is for example achieved by a method comprising:

receiving a registration request comprising network identity-related inquiry information from a user equipment or user;

obtaining network access technology-specific identification information based on the received network identity-related inquiry information;

appending the received network identity-related inquiry information with the obtained network access technology-specific identification information; and sending the appended network identity-related inquiry information.

According to the present invention, in a third aspect, this object is for example achieved by a method comprising:

receiving a registration request comprising first network access technology-specific identification information and network identity-related information;

obtaining second network access technology-specific identification information based on the received network identity-related information;

matching the received first network access technology-specific identification information against the obtained second network access technology-specific identification information; and authorizing access for a user equipment based on a result of matching.

According to further refinements of the invention as defined under the above third aspect, the received network identity-related information comprises an internet protocol multimedia subsystem private identity and an internet protocol multimedia subsystem public identity.

According to further refinements of the invention as defined under the above first to third aspects, the network access-technology-specific identification information comprises an identifier specific for worldwide interoperability for microwave access;

the network access-technology-specific identification information comprises one of a temporary and a pseudo identifier specific for a worldwide interoperability for microwave access subscription or session;

in the receiving, the received first network access technology-specific identification information comprises one of a temporary and a pseudo identifier specific for a worldwide interoperability for microwave access subscription or session, and the method further comprises obtaining, as the first network access technology-specific identification information, an actual identifier specific for worldwide interoperability for microwave access based on the received one of a temporary and a pseudo identifier specific for a worldwide interoperability for microwave access subscription or session;

in the receiving, the received first network access technology-specific identification information comprises one of a temporary and a pseudo identifier specific for a worldwide interoperability for microwave access subscription or session, wherein the obtaining is based on the received network identity-related information and the received first network access technology-specific identification information, and obtains, as the first network access-technology-specific identification information, a first actual identifier specific for worldwide interoperability for microwave access, and obtains, as the second network access-technology-specific identification information, a second actual identifier specific for worldwide interoperability for microwave access;

in the receiving, the received inquiry comprises both network identity-related information and one of a temporary and a pseudo identifier specific for a worldwide interoperability for microwave access subscription or session, wherein the method further comprises obtaining, from another network element, a first actual identifier specific for worldwide interoperability for microwave access based on the received one of a temporary and a pseudo identifier specific for a worldwide interoperability for microwave access subscription or session, wherein, in the resolving, the received network identity-related information is resolved based on the provided relation to provide a second actual identifier specific for worldwide interoperability for microwave access, and wherein, in the sending, the response comprises both the first obtained actual identifier specific for worldwide interoperability for microwave access and the resolved second actual identifier specific for worldwide interoperability for microwave access;

the network access technology-related identification information comprises at least one of a network access identifier, a security parameter index value, and an access, authorization and accounting server identification;

the network identity-related information comprises a mobile internet protocol home address;

the network identity-related information is a internet protocol address used by the user equipment, the internet protocol address being ensured to be constituted by the internet protocol address correspondingly allocated by a network to the user equipment.

According to the present invention, in a fourth aspect, this object is for example achieved by an apparatus comprising:

means for providing a relation of network access technology-specific identification information of a user equipment or user and network identity-related information of the user equipment;

means for receiving an inquiry comprising network identity-related inquiry information;

means for resolving the received network identity-related inquiry information based on the provided relation; and means for sending a response comprising the network access technology-specific identification information according to a result of the resolved network identity-related inquiry information.

According to further refinements of the invention as defined under the above fourth aspect, the network identity-related information and the network identity-related inquiry information respectively comprise an internet protocol address allocated to the user equipment;

the network identity-related information and the network identity-related inquiry information respectively comprise an internet protocol multimedia subsystem private identity and an internet protocol multimedia subsystem public identity.

According to the present invention, in a fifth aspect, this object is for example achieved by an apparatus comprising:

means for receiving a registration request comprising network identity-related inquiry information from a user equipment or user;

means for obtaining network access technology-specific identification information based on the received network identity-related inquiry information;

means for appending the received network identity-related inquiry information with the obtained network access technology-specific identification information; and means for sending the appended network identity-related inquiry information.

According to the present invention, in a sixth aspect, this object is for example achieved by an apparatus comprising:

means for receiving a registration request comprising first network access technology-specific identification information and network identity-related information;

means for obtaining second network access technology-specific identification information based on the received network identity-related information;

means for matching the received first network access technology-specific identification information against the obtained second network access technology-specific identification information; and means for authorizing access for a user equipment based on a result of matching.

According to further refinements of the invention as defined under the above sixth aspect, the received network identity-related information comprises an internet protocol multimedia subsystem private identity and an internet protocol multimedia subsystem public identity.

According to further refinements of the invention as defined under the above fourth to sixth aspects, the network access-technology-specific identification information comprises an identifier specific for worldwide interoperability for microwave access;

the network access-technology-specific identification information comprises one of a temporary and a pseudo identifier specific for a worldwide interoperability for microwave access subscription or session;

the means for receiving is configured to receive the first network access technology-specific identification information comprising one of a temporary and a pseudo identifier specific for a worldwide interoperability for microwave access subscription or session, and the means for obtaining is configured to obtain, as the first network access technology-specific identification information, an actual identifier specific for worldwide interoperability for microwave access based on the received one of a temporary and a pseudo identifier specific for a worldwide interoperability for microwave access subscription or session;

the means for receiving is configured to receive the first network access technology-specific identification information comprising one of a temporary and a pseudo identifier specific for a worldwide interoperability for microwave access subscription or session, and the means for obtaining is configured to obtain, based on the received network identity-related information and the received first network access technology-specific identification information, and to obtain, as the first network access-technology-specific identification information, a first actual identifier specific for worldwide interoperability for microwave access, and to obtain, as the second network access-technology-specific identification information, a second actual identifier specific for worldwide interoperability for microwave access;

the means for receiving is configured to receive the inquiry comprises both network identity-related information and one of a temporary and a pseudo identifier specific for a worldwide interoperability for microwave access subscription or session, the means for obtaining is configured to obtain, from another network element, a first actual identifier specific for worldwide interoperability for microwave access based on the received one of a temporary and a pseudo identifier specific for a worldwide interoperability for microwave access subscription or session, the means for resolving is configured to resolve the received network identity-related information based on the provided relation to provide a second actual identifier specific for worldwide interoperability for microwave access, and the means for sending is configured to send the response comprising both the first obtained actual identifier specific for worldwide interoperability for microwave access and the resolved second actual identifier specific for worldwide interoperability for microwave access;

the network access technology-related identification information comprises at least one of a network access identifier, a security parameter index value, and an access, authorization and accounting server identification;

the network identity-related information comprises a mobile internet protocol home address;

the network identity-related information is a internet protocol address used by the user equipment, the internet protocol address being ensured to be constituted by the internet protocol address correspondingly allocated by a network to the user equipment;

the apparatus according to the first aspect is a user profile binding entity being a portion of one of a home subscriber server and an access, authorization and accounting server or interfacing with at least one of the home subscriber server and the access, authorization and accounting server;

the apparatus according to the first aspect is an access control support entity being a portion of or interfacing with one of a mobile internet protocol home agent and an internet protocol router;

the apparatus is implemented as a chipset or module.

According to the present invention, in a seventh aspect, this object is for example achieved by a system comprising:

a user equipment;
apparatuses according to the above fourth aspect;
an apparatus according to the above fifth aspect; and
an apparatus according to the above sixth aspect.

According to the present invention, in an eighth aspect, this object is for example achieved by a computer program product comprising code means for performing methods steps of a method according to any one of the above first to third aspects, when run on a computer.

In this connection, it has to be pointed out that the present invention enables one or more of the following:

UICC-free IMS access authorization for WiMAX mobile stations/user equipments.

Reducing costs for operators and customers to consume IMS services.

A low-cost network based security solution for IMS that is able to support any IMS capable user device and that offers an appropriate security level.

Possibility of parallel usage with any other security mechanisms securing IMS access e.g. through WiMAX to provide an additional security step, resulting in a more secure overall system.

BRIEF DESCRIPTION OF THE DRAWINGS

Embodiments of the present invention are described herein below with reference to the accompanying drawings, in which.

DETAILED DESCRIPTION OF EMBODIMENTS OF THE PRESENT INVENTION

Embodiments of the present invention are described herein below by way of example with reference to the accompanying drawings.

The embodiments may be summarized according to the following: The present invention is related to introduce e.g. an IMS access authorization method that does not require the presence of a UICC in the WiMAX Mobile Station, but re-uses the WiMAX network access authorization methods and features inherently implemented in WiMAX Mobile Stations and networks for the purpose of granting access to IMS services.

It is to be noted that for this description, the terms "WiMAX_ID (identifier specific for WiMAX, e.g. a NAI (Network Access Identifier), see below), WID_t (identifier specific for a WiMAX subscription or session, see below)" and "IMPI/IMPU, IP address" are examples for "network access technology-specific identification information" and "network identity-related information", respectively, without restricting the latter terms to the special technical or implementation details imposed to the terms "WiMAX_ID, WID_t" and "IMPI/IMPU, IP address".

[First Embodiment]

Figure 1:
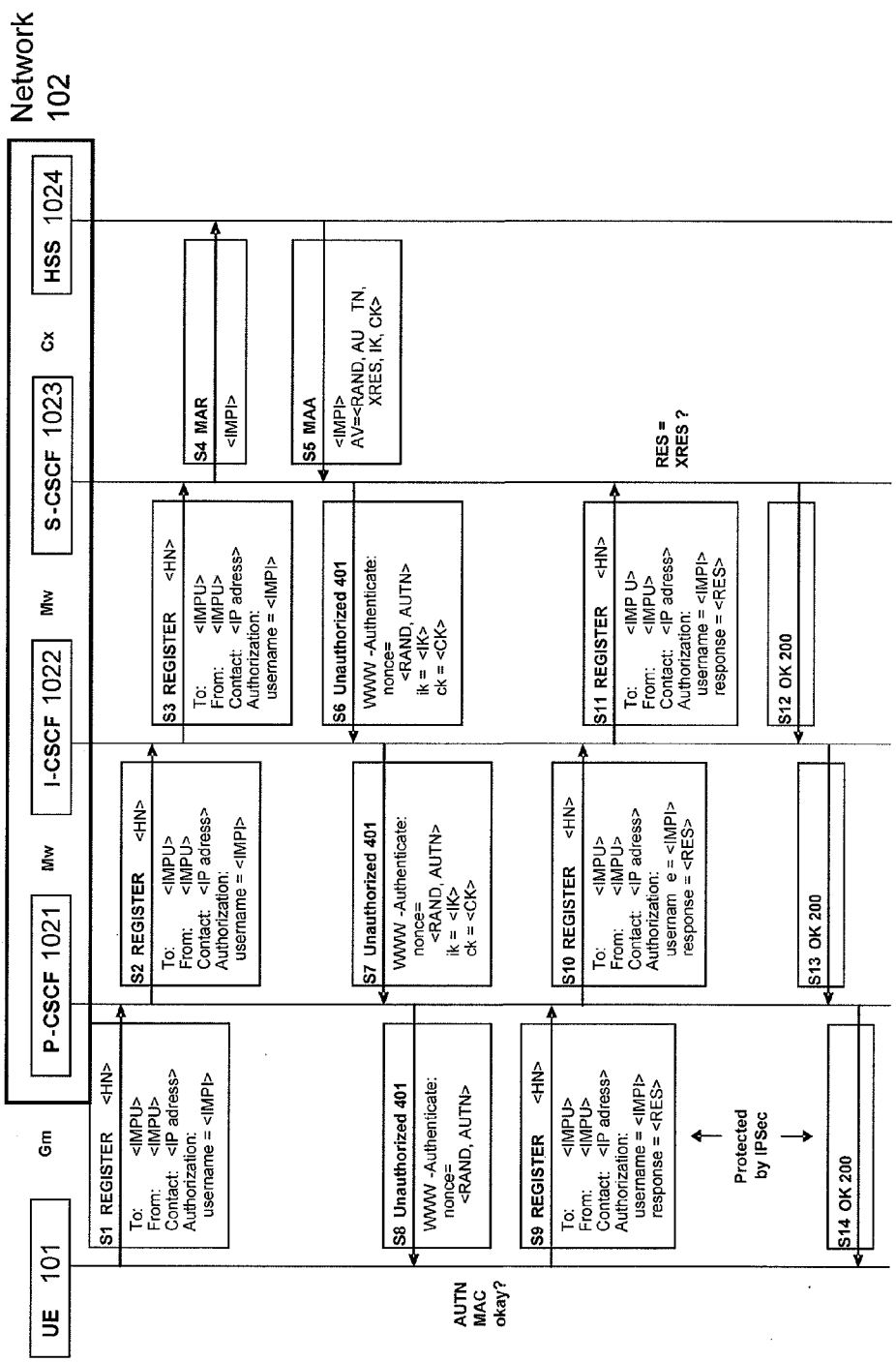
FIG. 1 shows a method for user equipment authorization as specified by e.g. by 3GPP TS 33.203.
Figure 2:
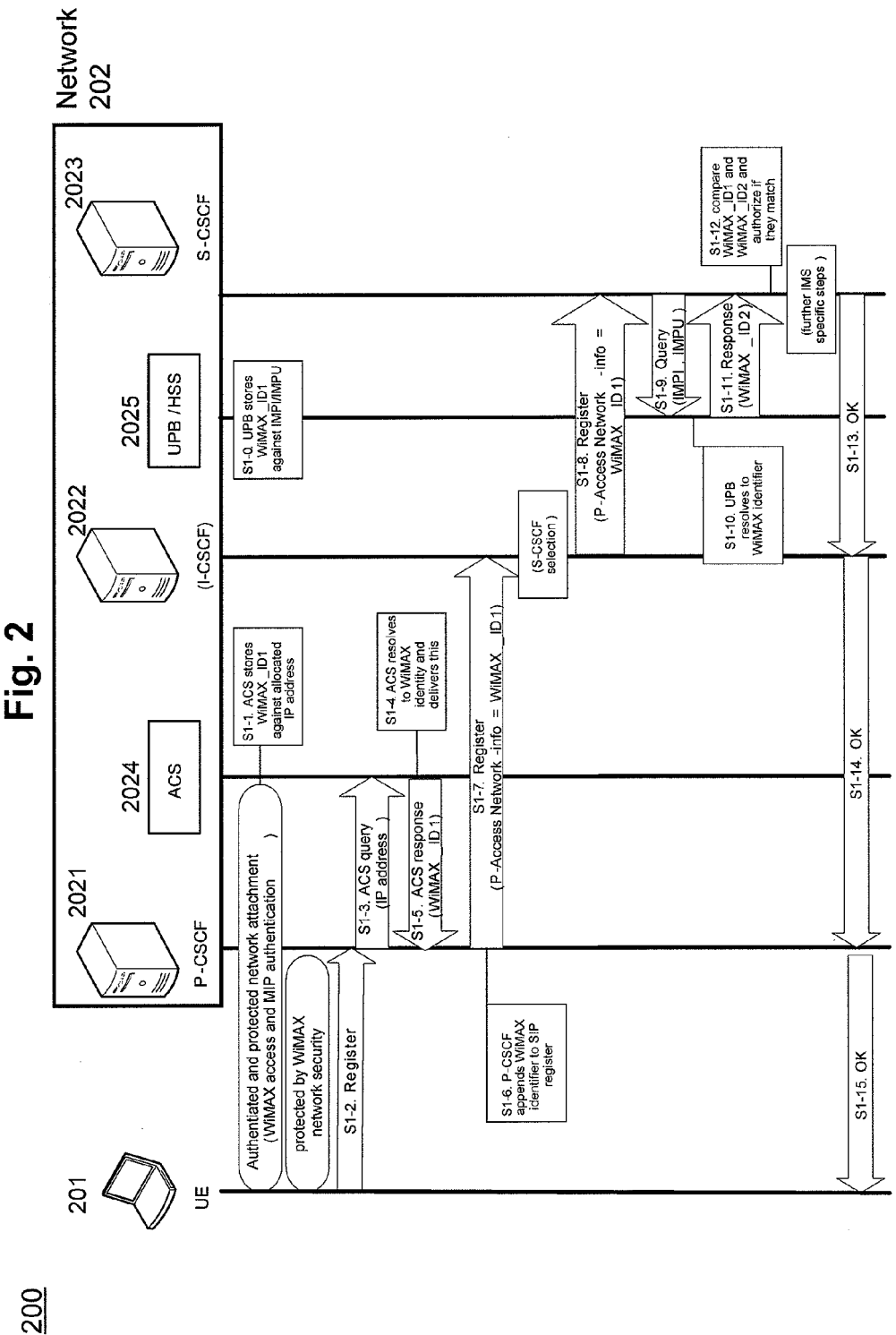
FIG. 2 shows respective methods for user equipment authorization according to a first embodiment of the present invention.

As shown in FIG. 2, a communication system 200 may comprise a UE 201 and a network 202. The network 202 in turn may comprise a P-CSCF 2021, an optional I-CSCF 2022, a S-CSCF 2023, an ACS function 2024 and a UBP function 2025 (e.g. in a HSS (Home Subscriber Server)) 1024. Signalling between elements is indicated in horizontal direction, while time aspects between signalling are reflected in the vertical arrangement of the signalling sequence as well as in the sequence numbers.

As a preparatory measure, in step S1-0, a relation of network access technology-specific identification information (e.g. WiMAX_ID1, such as NAI) of a user equipment (e.g. UE 201) and network identity-related information (e.g. IP address) of the user equipment or user may be stored and provided by the ACS 2024. In addition, a relation of network access technology-specific identification information (e.g. WiMAX_ID2, such as NAI) of a user equipment (e.g. UE 201) and network identity-related information (e.g. IMPI, IMPU) of the user equipment or user may be stored and provided by the UPB 2025.

In step S1-2, e.g. the P-CSCF 2021 may perform receiving a registration request (e.g. Register) comprising network identity-related inquiry information (e.g. the IP address and SIP information) from a user equipment (e.g. UE 201).

In steps S1-3 and S1-5, e.g. the P-CSCF 2021 may perform obtaining, e.g. from the ACS 2024, network access technology-specific identification information (e.g. WiMAX specific identifier WiMAX_ID1) based on the received network identity-related inquiry information.

In addition, concerning steps S1-3 to S1-5, in step 1-3, e.g. the ACS 2024 may perform receiving (e.g. from the P-CSCF 2021) the inquiry comprising the network identity-related inquiry information (e.g. IP address of the UE 201).

In step S1-4, e.g. the ACS 2024 may perform resolving the received network identity-related inquiry information (e.g. IP address of the UE 201) based on the provided relation (stored and provided in step S1-1 as described hereinabove).

And, in step S1-5, e.g. the ACS 2024 may perform sending a response (e.g. to the P-CSCF 2021) comprising the network access technology-specific identification information (e.g. WiMAX_ID1) according to a result of the resolved network identity-related inquiry information (e.g. IP address of the UE 201).

In step S1-6, e.g. the P-CSCF 2021 may perform appending the received network identity-related inquiry information (e.g. SIP information) with the obtained network access technology-specific identification information (e.g. WiMAX specific identifier WiMAX_ID1).

And, in step S1-7, e.g. the P-CSCF may perform sending the appended network identity-related inquiry information (e.g. SPI (IMPI, IMPU) and WiMAX_ID1).

It is to be noted that the appended network address inquiry information may be sent directly to the S-CSCF 2023, or alternatively, via the optional I-CSCF 2022.

In step S1-8, e.g. the S-CSCF 2023 may perform receiving (e.g. from the P-CSCF 2021) a registration request comprising first network access technology-specific identification information (e.g. WiMAX_ID1) and network identity-related information (e.g. IMPI, IMPU).

In steps S1-9 and S1-11, e.g. the S-CSCF 2023 may perform obtaining (e.g. from the UPB 2025) second network access technology-specific identification information (e.g. WiMAX specific identifier WiMAX_ID2) based on the received network identity-related information (e.g. IMPI, IMPU).

Concerning steps S1-9 to S1-11, in step S1-9, e.g. the UPB 2025 may perform receiving (e.g. from the S-CSCF 2023) an inquiry comprising network identity-related inquiry information (e.g. IMPI, IMPU).

In step S1-10, e.g. the UPB 2025 may perform resolving the received network identity-related inquiry information (e.g. IMPI, IMPU) based on the provided relation (stored and provided in step S1-0 as described hereinabove).

And, in step S1-11, e.g. the UPB 2025 may perform sending (e.g. to the S-CSCF 2023) a response comprising the network access technology-specific identification information (e.g. WiMAX_ID2) according to a result of the resolved network identity-related inquiry information (e.g. IMPI, IMPU).

Furthermore, in step S1-12, e.g. the S-CSCF 2023 may perform matching the received (e.g. from the P-CSCF 2021) first network access technology-specific identification information (e.g. WiMAX_ID1) against the obtained (e.g. from the UPB 2025) second network access technology-specific identification information (e.g. WiMAX_ID2).

And, in step S1-12, e.g. the S-CSCF 2023 may perform authorizing access for the user equipment (e.g. UE 201) based on a result of matching. The authorization of access may be performed e.g. via the optional I-CSCF 2022 and the P-CSCF 2021 in steps S1-13 to S1-15.

According to further developments of the methods according to the present invention, the network identity-related information and the network identity-related inquiry information may respectively comprise an internet protocol address allocated to the user equipment.

Alternatively, the network identity-related information and the network identity-related inquiry information may respectively comprise an internet protocol multimedia subsystem private identity and an internet protocol multimedia subsystem public identity.

Furthermore, the network access technology-related identification information may comprise at least one of a network access identifier, a security parameter index value, and an access, authorization and accounting server identification. In addition, the network identity-related information may comprise a mobile internet protocol home address. And, the network identity-related information may be an internet protocol address used by the user equipment, the internet protocol address being ensured to be constituted by the internet protocol address correspondingly allocated by a network to the user equipment.

Figure 3:
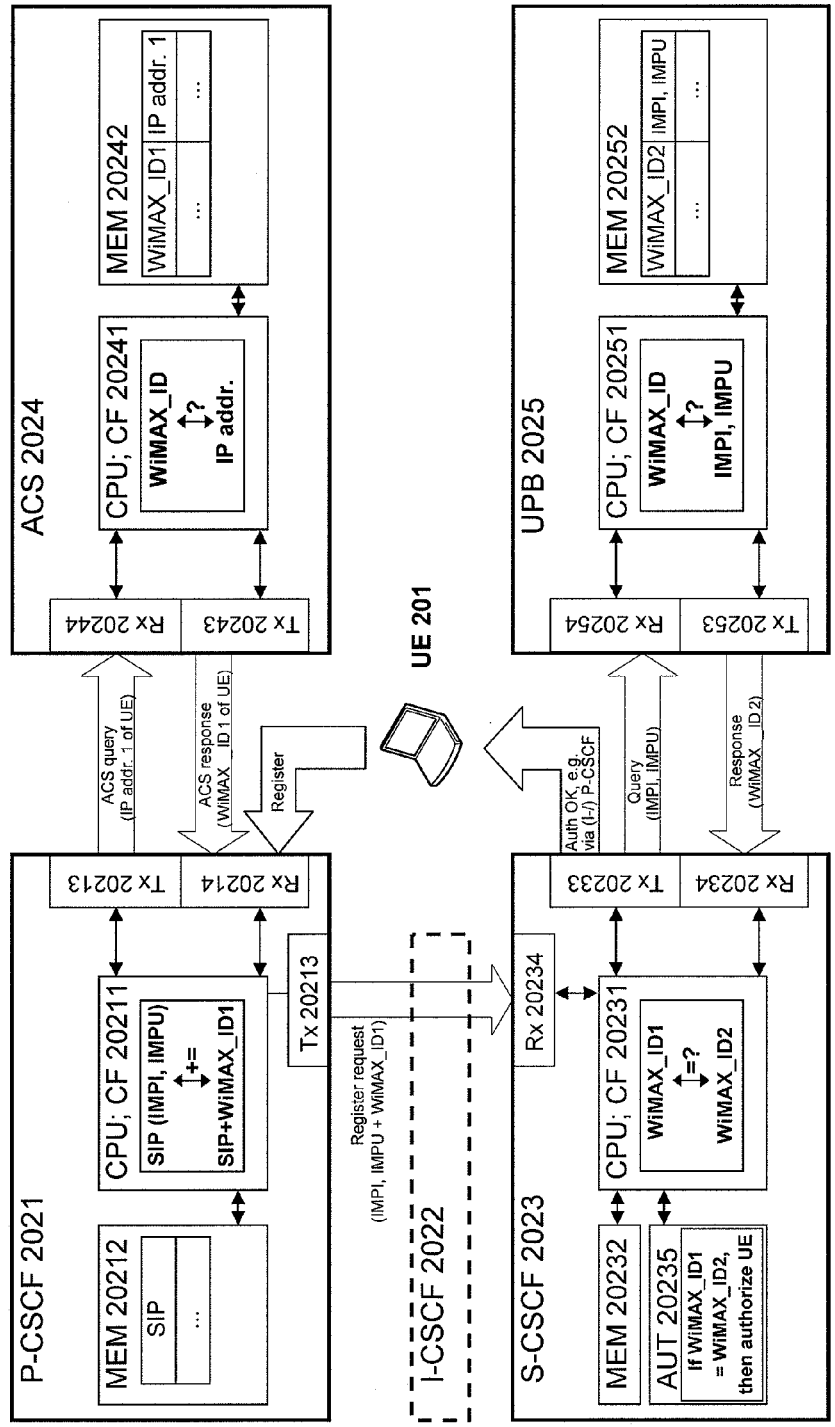
FIG. 3 shows respective apparatuses (e.g. ACS (Access Control Support), UPB (User Profile Binding), P-CSCF and S-CSCF functions) for user equipment authorization according to the first embodiment of the present invention.

FIG. 3 shows respective apparatuses (e.g. ACS 2024, UPB 2025, P-CSCF 2021 and S-CSCF 2023) for user equipment authorization according to the first embodiment of the present invention.

The P-CSCF 2021 may comprise a central processing unit CPU or core functionality CF (referred to as "CPU" hereinafter) 20211, a memory 20212, a sender (or means for sending) Tx 20213 and a receiver (or means for receiving) Rx 20214. The S-CSCF 2023 may comprise a CPU 20231, a memory 20232, a sender (or means for sending) Tx 20233, a receiver (or means for receiving) Rx 20234 and an authorizer (or means for authorizing) 20235. The ACS 2024 may comprise a CPU 20241, a memory 20242, a sender (or means for sending) Tx 20243 and a receiver (or means for receiving) Rx 20244. And, the UPB 2025 may comprise a CPU 20251, a memory 20252, a sender (or means for sending) Tx 20253 and a receiver (or means for receiving) Rx 20254.

The CPUs 202x1 (wherein x=1, 3, 4, and 5) may respectively be configured to process various data inputs and to control the functions of the memories 202x2, the senders 202x3 and the receivers 202x4.

The memories 202x2 may respectively serve e.g. for storing code means for carrying out e.g. the respective method according to the invention, when run on the CPUs 202x1. It is to be noted that the senders 202x3 and the receivers 202x4 may alternatively be provided as respective integral transceivers (not shown).

As a preparatory measure, a relation of network access technology-specific identification information (e.g. WiMAX_ID1) of a user equipment (e.g. UE 201) or user and network identity-related information (e.g. IP address) of the user equipment may be stored and provided in memory 20242 (means for providing) of the ACS 2024. In addition, a relation of network access technology-specific identification information (e.g. WiMAX_ID2) of a user equipment (e.g. UE 201) or user and network identity-related information (e.g. IMPI, IMPU) of the user equipment may be stored and provided by the memory 20252 (means for providing) of the UPB 2025.

Then, e.g. the means for receiving 20214 of the P-CSCF 2021 may be configured to receive a registration request comprising network identity-related inquiry information (e.g. SIP request, IMPI+IMPU) from a user equipment (e.g. UE 2021).

For example, the CPU 20211 in conjunction with the sender 20213 and the receiver 20214 (means for obtaining) of the P-CSCF 2021 may be configured to obtain network access technology-specific identification information (e.g. WiMAX specific identifier WiMAX_ID1, such as NAI) based on the received network identity-related inquiry information (e.g. IP address of the UE 201).

For example, the means for receiving 20244 e.g. in conjunction with the CPU 20241 of the ACS 2024 may be configured to receive (e.g. from the P-CSCF 2021) an inquiry comprising network identity-related inquiry information (e.g. IP address of the UE 201).

Then, e.g. the CPU 20241 in conjunction with the memory 20242 (means for resolving) of the ACS 2024 may be configured to resolve the received network identity-related inquiry information (e.g. IP address of the UE 201) based on the provided relation (stored e.g. in the memory 20242 of the ACS 2024).

And, the means for sending 20243 e.g. in conjunction with the CPU 20241 may be configured to send a response comprising the network access technology-specific identification information (WiMAX_ID1) according to a result of the resolved network identity-related inquiry information (e.g. IP address 1 of the UE 201).

Then, e.g. the CPU 20211 of the P-CSCF 2021 in conjunction with the memory 20212 (means for appending) may be configured to append the received network identity-related inquiry information (e.g. SIP, IMPI+IMPU) with the obtained network access technology-specific identification information (e.g. WiMAX_ID1).

And, the means for sending 20213 of the P-CSCF 2021 may be configured to send the appended network identity-related inquiry information (e.g. SIP or IMPI, IMPU+WiMAX_ID1).

Furthermore, the means for receiving 20234 of the S-CSCF 2023 may configured to receive (e.g. from the P-CSCF 2021 e.g. via the optional I-CSCF 2022) a registration request comprising first network access technology-specific identification information (e.g. WiMAX_ID1) and network identity-related information (e.g. IMPI, IMPU).

Then, e.g. the CPU 20231 in conjunction with the sender 20233 and the receiver 20234 (means for obtaining) may be configured to obtain (e.g. from the UPB 2025) second network access technology-specific identification information (e.g. WiMAX specific identifier WiMAX_ID2, such as NAI) based on the received network identity-related information (e.g. IMPI, IMPU+WiMAX_ID2);

Concerning the obtaining operation, the means for receiving 20254 e.g. in conjunction with the CPU 20251 of the UPB 2025 may be configured to receive the inquiry (e.g. from the S-CSCF 2023) comprising network identity-related inquiry information (e.g. IMPI, IMPU).

Then, e.g. the CPU 20251 in conjunction with the memory 20252 (means for resolving) of the UPB 2025 may be configured to resolve the received network identity-related inquiry information (e.g. IMPI, IMPU) based on the provided relation (stored e.g. in the memory 20252 of the UPB 2025).

And, the means for sending 20253 e.g. in conjunction with the CPU 20251 of the UPB 2025 may be configured to send a response comprising the network access technology-specific identification information (e.g. WiMAX_ID2) according to a result of the resolved network identity-related inquiry information (e.g. IMPI, IMPU).

Afterwards, e.g. the CPU 20231 (means for matching) of the S-CSCF 2023 may be configured to match received first network access technology-specific identification information (e.g. WiMAX_ID1) against the obtained second network access technology-specific identification information (e.g. WiMAX_ID2).

And, the means for authorizing 20235 e.g. in conjunction with the CPU 20231 of the S-CSCF 2023 may be configured to authorize access for the user equipment (e.g. UE 201) based on a result of matching e.g. via the P-CSCF 2021 (and optionally via the I-CSCF 2022).

According to further developments of the apparatuses according to the present invention, the network identity-related information and the network identity-related inquiry information may respectively comprise an internet protocol address allocated to the user equipment.

Alternatively, the network identity-related information and the network identity-related inquiry information may respectively comprise an internet protocol multimedia subsystem private identity and an internet protocol multimedia subsystem public identity.

Furthermore, the network access technology-related identification information may comprise at least one of a network access identifier, a security parameter index value, and an access, authorization and accounting server identification. In addition, the network identity-related information may comprise a mobile internet protocol home address. And, the network identity-related information may be an internet protocol address used by the user equipment, the internet protocol address being ensured to be constituted by the internet protocol address correspondingly allocated by a network to the user equipment.

Furthermore, the UPB 2025 may be a portion of one of a home subscriber server and an access, authorization and accounting server or interfacing with at least one of the home subscriber server and the access, authorization and accounting server.

In addition, the ACS 2024 may be a portion of or interfacing with a mobile internet protocol home agent or an internet protocol router.

In addition, the P-CSCF 2021, the S-CSCF 2023, the ACS 2024 and(or the UPB 2025 may implemented as a chipset or module.

Without being restricted to the details following in this section, the first embodiment of the present invention may be summarized as follows:
a User Profile Binding (UPB) function
    stores an identifier specific to the WiMAX subscription or session of a MS/User against the IMPU and IMPI being part of the MS/User's IMS subscription, and
    upon request received from the S-CSCF, returns to the S-CSCF that WiMAX-specific identifier stored against that IMPU and IMPI,
an Access Control Support (ACS) function in the WiMAX network
    stores after successful WiMAX network access authorization said WiMAX-specific identifier of the MS against an IP address allocated to the MS and resolves to the IMS system on request an IP address to said identifier,
a P-CSCF
    upon reception of a SIP Register request from the MS, asks that Access Control Support function for the WiMAX-specific identifier associated to the IP address as included in the SIP Register request, and
    appends said WiMAX-specific identifier of the MS to SIP Register requests sent by the MS to its IMS Home Network, and
a S-CSCF
    upon reception of the modified SIP Register request from the P-CSCF, sends the IMPU and IMPI contained in that request to the HSS which then returns to the S-CSCF the WiMAX-specific identifier stored against that IMPU and IMPI, and
    authorizes the MS/user to access the IMS service if and only if the WiMAX-specific identifier as included by the P-CSCF into that SIP Register request coincides with the WiMAX-specific identifier as provided by the HSS.
where the WiMAX specific identifier can as a not limiting example be an NAI according to IETF RFC 4282,
or the WiMAX specific identifier can be a SPI value used for the MN-HA security association for protecting MIP messages,
or the WiMAX specific identifier can be a AAA session ID as described by [NWG-stage-3],
or the WiMAX specific identifier can be any combination of two or more of the above identifiers.
Where the UPB function can be part of a HSS or a AAA server or can interface with a HSS and/or a AAA server,
the ACS function can be part of, or can interface with a Mobile IP (RFC3344, RFC3775) Home Agent or e.g. a standard IP router.
Where the IP address can be a Mobile IP HoA (home address).

Where the WiMAX network, for additional security, should ensure that the IP address used by the MS/user device is the IP address assigned to this MS to prevent IP address spoofing.

[Second Embodiment]

Figure 4:
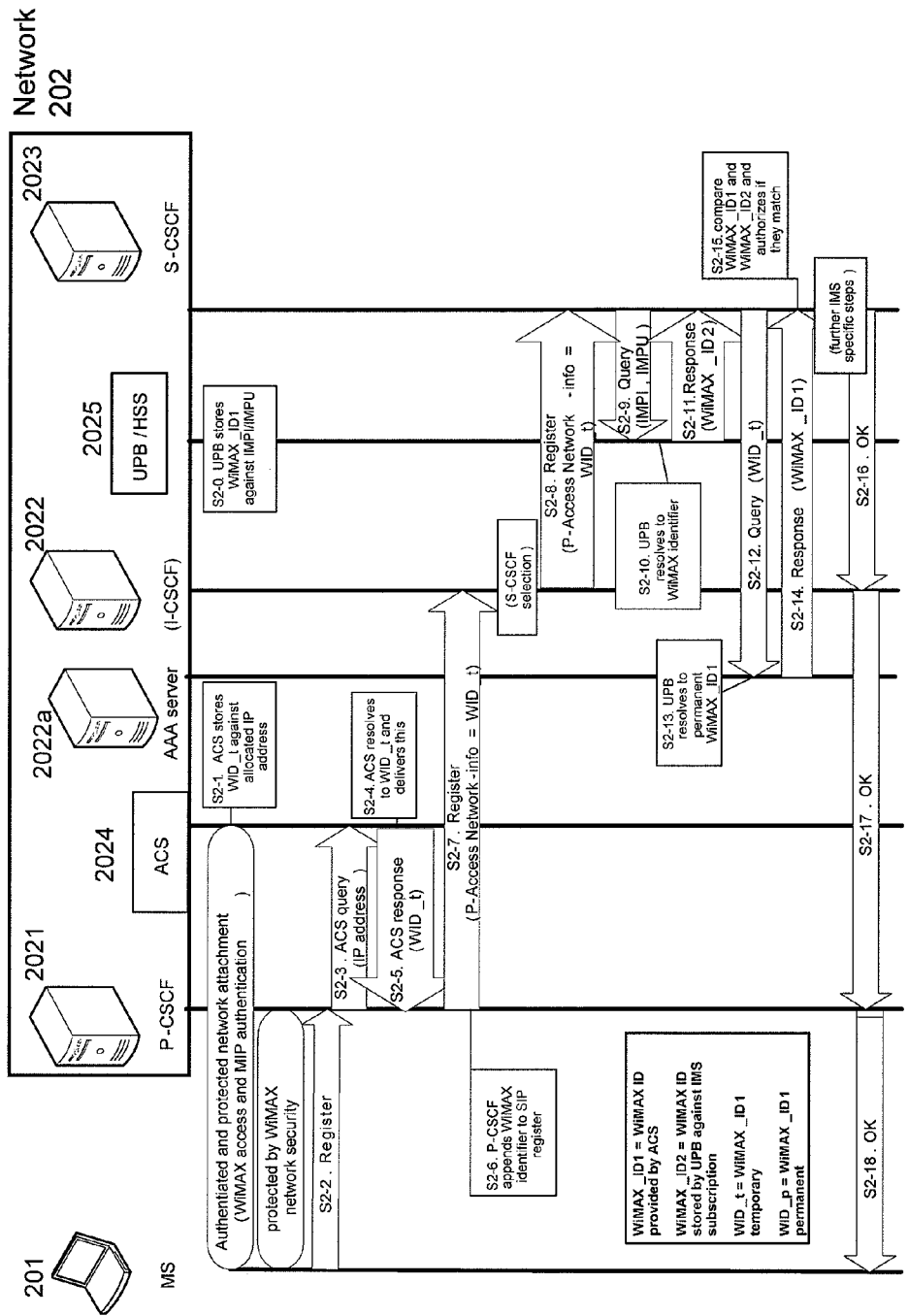
FIG. 4 shows respective methods for user equipment authorization according to a second embodiment of the present invention.

FIG. 4 shows respective methods for user equipment authorization according to the second embodiment of the present invention. Reference signs of FIG. 4 identical with those of FIG. 2 denote the same or similar elements. In addition, the network 202 may further comprise an AAA (access, authorization and accounting) server 2022a. Again, signalling between elements is indicated in horizontal direction, while time aspects between signalling are reflected in the vertical arrangement of the signalling sequence as well as in the sequence numbers.

Steps S2-0 to S2-11 according to the second embodiment may be performed in the same manner as steps S1-0 to S1-11 according to the first embodiment with the exception that all occurrences of the identifier specific for an access technology (i.e. WiMAX_ID1) are replaced with the one of a temporary and a pseudo identifier specific for a subscription or session (i.e. WID_t).

However, in steps S2-12 to S2-14, e.g. the S-CSCF 2023 may perform obtaining (e.g. from the AAA server 2022a), as the first network access technology-specific identification information (e.g. WiMAX_ID1), an actual identifier (e.g. WiMAX_ID1) specific e.g. for worldwide interoperability for microwave access based on the received one of a temporary and a pseudo identifier (e.g. WID_t) specific e.g. for a worldwide interoperability for microwave access subscription or session.

Afterwards, steps S2-15 to S2-18 according to the second embodiment may be performed in the same manner as steps S1-12 to S1-15 according to the first embodiment.

Figure 5:
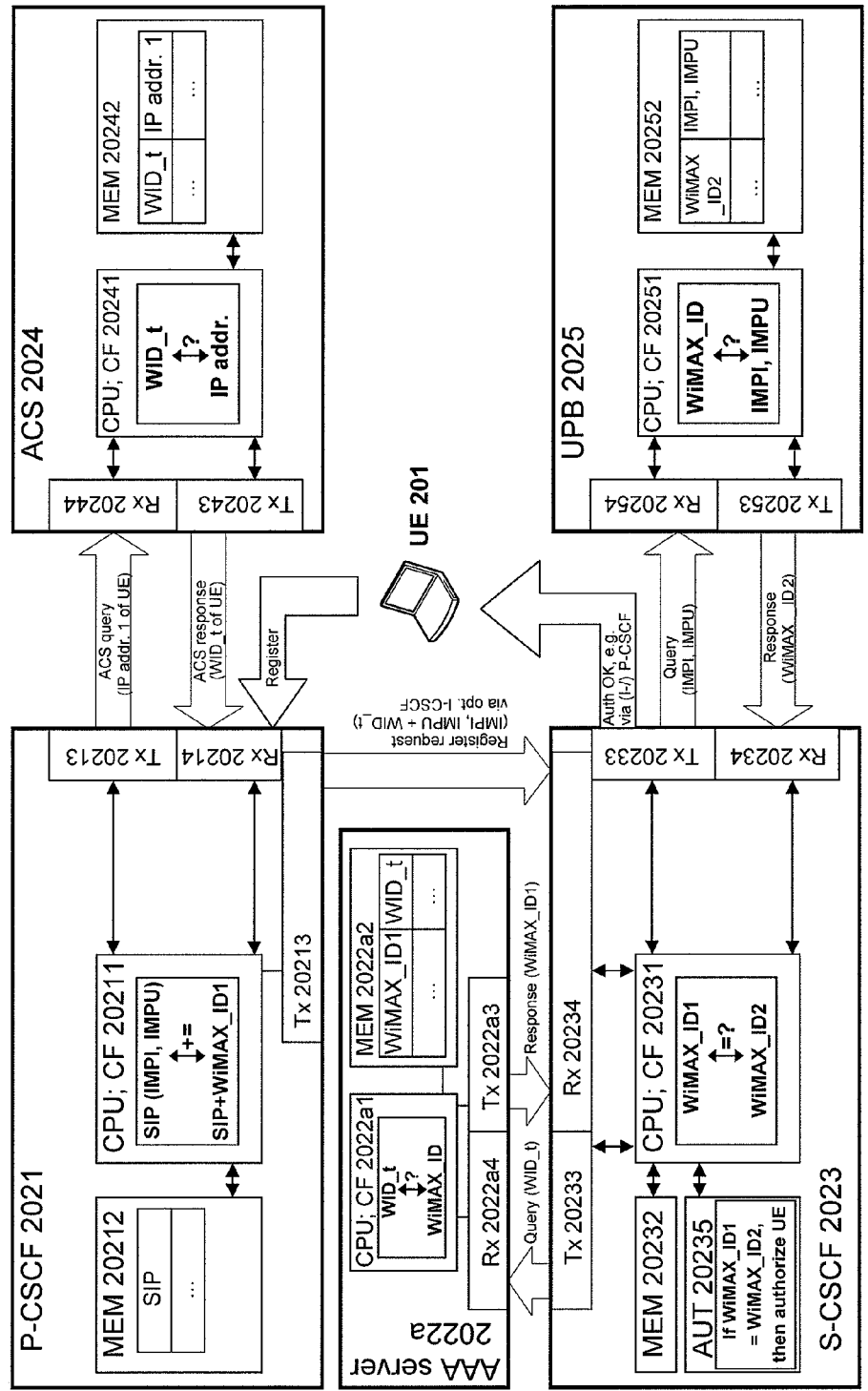
FIG. 5 shows respective apparatuses (e.g. ACS (Access Control Support), UPB (User Profile Binding), P-CSCF and S-CSCF functions) for user equipment authorization according to the second embodiment of the present invention.

FIG. 5 shows respective apparatuses (e.g. ACS, UPB, P-CSCF and S-CSCF functions) for user equipment authorization according to the second embodiment of the present invention. Reference signs of FIG. 5 identical with those of FIG. 3 denote the same or similar elements.

In addition, the AAA server 2022a comprises a CPU 2022a1, a memory 2022a2, a sender Tx 2022a3 and a receiver Rx 2022a4. The CPU 2022a1 is configured to process various data inputs and to control the functions of the memory 2022a2, the sender 2022a3 and the receiver 2022a4. The memory 2022a2 serves for storing a relation between the temporary or pseudo identifier (e.g. WID_t) and the actual identifier (e.g. WiMAX_ID1). It is to be noted that the sender 2022a3 and the receiver 2022a4 may alternatively be provided as an integral transceiver (not shown).

As already described hereinabove in conjunction with FIG. 4, the means for receiving 20234 of the S-CSCF 2023 may configured to receive the first network access technology-specific identification information comprising one of a temporary and a pseudo identifier specific for a worldwide interoperability for microwave access subscription or session (e.g. WID_t), and the means for obtaining 20231, 20233, 20234 may be configured to obtain (e.g. from the AAA server 2022a), as the first network access technology-specific identification information (e.g. WiMAX_ID1), an actual identifier (e.g. WiMAX_ID1) specific e.g. for worldwide interoperability for microwave access based on the received one of a temporary and a pseudo identifier specific for a worldwide interoperability for microwave access subscription or session.

Without being restricted to the details following in this section, the second embodiment of the present invention may be summarized as follows:

a S-CSCF
  upon reception of the modified SIP Register request containing a temporary/pseudo-ID from the P-CSCF, sends the IMPU and IMPI contained in that request to the HSS which then returns to the S-CSCF the WiMAX-specific identifier stored against that IMPU and IMPI,
  upon reception of the modified SIP Register request containing a temporary/pseudo-ID from the P-CSCF, resolves the temporary/pseudo-ID by interfacing with an AAA server or a HSS, and
  authorizes the MS/user to access the IMS service if and only if the WiMAX-specific identifier as included by the P-CSCF into that SIP Register request coincides with the WiMAX-specific identifier as provided by the HSS.

[Modification of the Second Embodiment]

Figure 6:
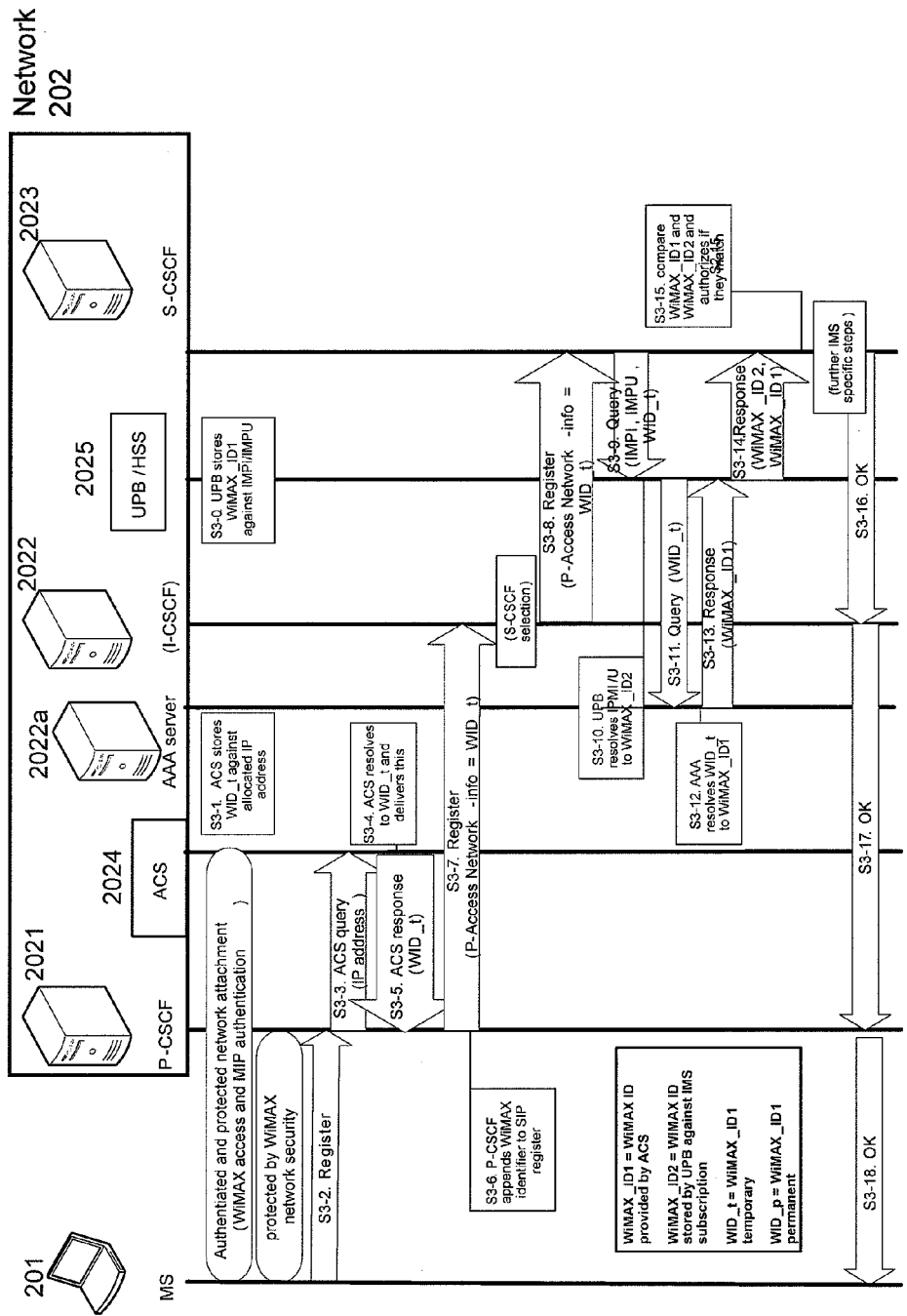
FIG. 6 shows respective methods for user equipment authorization according to a modification of the second embodiment of the present invention.
Figure 7:
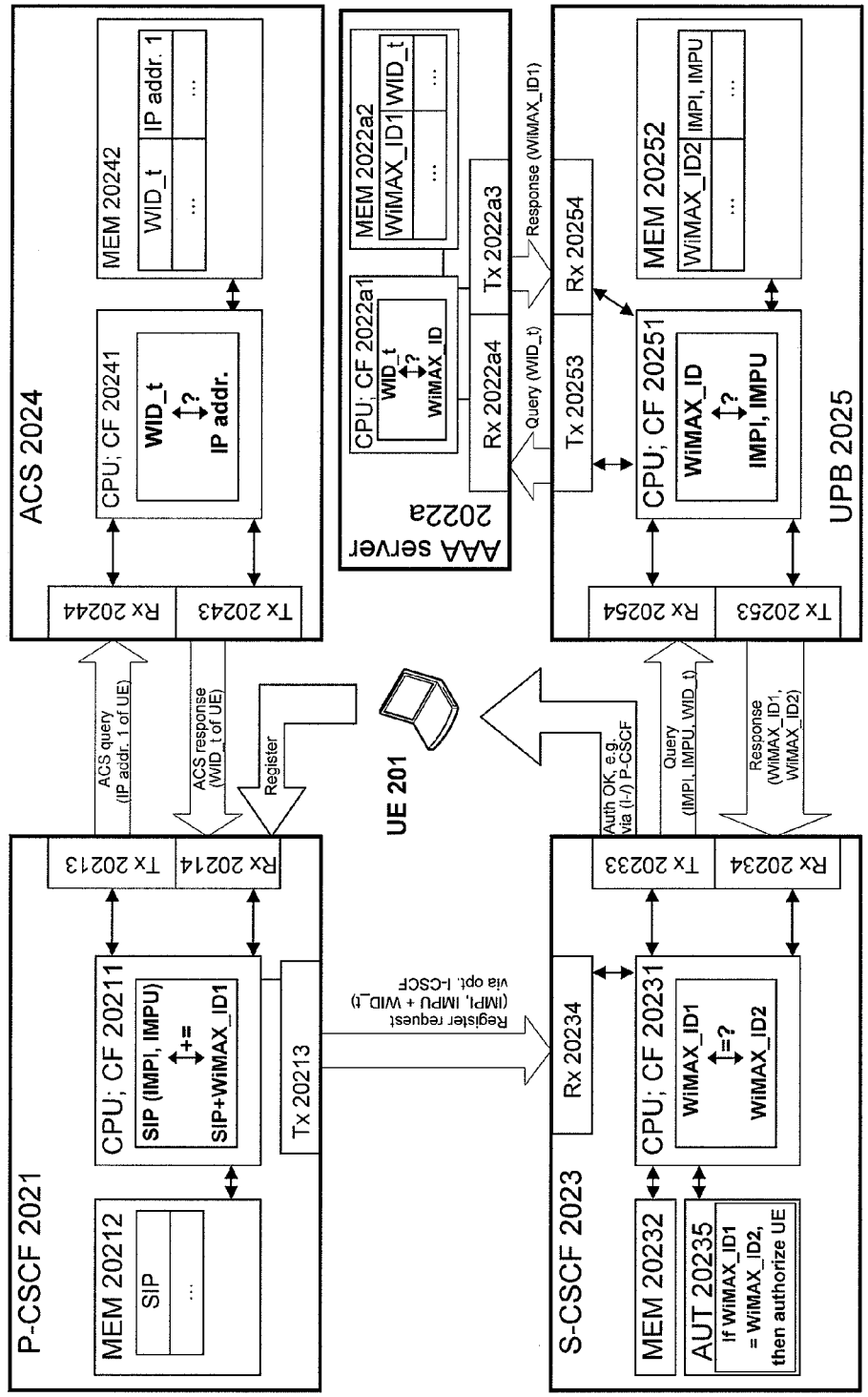
FIG. 7 shows respective apparatuses (e.g. ACS, UPB, P-CSCF and S-CSCF functions) for user equipment authorization according to the modification of the second embodiment of the present invention.

Alternatively, in the modification of the second embodiment shown in FIGS. 6 and 7, the comparison of the permanent/actual WiMAX identifier retrieved from the IMS subscription data by the UPB/HSS 2025 and the one resolved by the AAA server 2022a can be done by the UPB 2025 instead of the S-CSCF 2023.

FIG. 6 shows respective methods for user equipment authorization according to a modification of the second embodiment of the present invention. Reference signs of FIG. 6 identical with those of FIG. 4 denote the same or similar elements. Again, signalling between elements is indicated in horizontal direction, while time aspects between signalling are reflected in the vertical arrangement of the signalling sequence as well as in the sequence numbers.

Steps S3-0 to S3-8 according to the modification of the second embodiment may be performed in the same manner as steps S2-0 to S2-8 according to the second embodiment.

In step S3-9 and S3-14, e.g. the S-CSCF 2023 may perform obtaining (e.g. from the AAA server 2022a via the UPB 2025) based on the received network identity-related information (e.g. IMPI, IMPU) and the received first network access technology-specific identification information (e.g. WID_t), and obtains, as the first network access-technology-specific identification information (e.g. WiMAX_ID1), a first actual identifier (e.g. WiMAX_ID1) specific e.g. for worldwide interoperability for microwave access, and obtains, as the second network access-technology-specific identification information (e.g. WiMAX_ID2), a second actual identifier (e.g. WiMAX_ID2) specific e.g. for worldwide interoperability for microwave access.

In addition, in step S3-9, e.g. the UPB 2025 may perform receiving the inquiry (e.g. from the S-CSCF 2023) comprising both network identity-related information (e.g. IMPI, IMPU) and one of a temporary and a pseudo identifier (e.g. WID_t) specific e.g. for a worldwide interoperability for microwave access subscription or session.

In steps S3-11 to S3-13, e.g. the UPB may perform obtaining, from another network element (e.g. the AAA server 2022a), a first actual identifier (WiMAX_ID1) specific e.g. for worldwide interoperability for microwave access based on the received one of a temporary and a pseudo identifier (e.g. WID_t) specific for a worldwide interoperability for microwave access subscription or session.

In step S3-10, e.g. the UPB 2025 may perform resolving similar to step S2-10 to provide a second actual identifier (e.g. WiMAX_ID2) specific e.g. for worldwide interoperability for microwave access.

In step S3-14 e.g. the UPB 2025 may perform sending (e.g. to the S-CSCF 2023), the response comprising both the first obtained actual identifier (e.g. WiMAX_ID1) specific e.g. for worldwide interoperability for microwave access and the resolved second actual identifier (e.g. WiMAX_ID2) specific e.g. for worldwide interoperability for microwave access.

Afterwards, steps S3-15 to S3-18 according to the modification of the second embodiment may be performed in the same manner as steps S2-15 to S2-18 according to the second embodiment.

FIG. 7 shows respective apparatuses (e.g. ACS, UPB, P-CSCF and S-CSCF functions) for user equipment authorization according to the modification of the second embodiment of the present invention. Reference signs of FIG. 7 identical with those of FIG. 5 denote the same or similar elements.

As already described in conjunction with FIGS. 5 and 6 hereinabove, the means for obtaining 20231, 20223, 20234 of the S-CSCF 2023 may be configured to obtain, based on the received network identity-related information (e.g. IMPI, IMPU) and the received first network access technology-specific identification information (e.g. WID_t), and to obtain (e.g. from the AAA server 2022a via the UPB 2025), as the first network access-technology-specific identification information (e.g. WiMAX_ID1), a first actual identifier (e.g. WiMAX_ID1) specific e.g. for worldwide interoperability for microwave access, and to obtain, as the second network access-technology-specific identification information (e.g. WiMAX_ID2), a second actual identifier (e.g. WiMAX_ID2) specific e.g. for worldwide interoperability for microwave access.

In addition, the means for receiving 20254 of the UPB 2025 may be configured to receive the inquiry comprising both network identity-related information (e.g. IMPI, IMPU) and one of a temporary and a pseudo identifier (e.g. WID_t) specific e.g. for a worldwide interoperability for microwave access subscription or session.

Furthermore, the means for obtaining 20251, 20253, 20254 of the UPB 2025 may be configured to obtain, from another network element (e.g. the AAA server 2022a), a first actual identifier (e.g. WiMAX_ID1) specific for e.g. worldwide interoperability for microwave access based on the received one of a temporary and a pseudo identifier (e.g. WID_T) specific e.g. for a worldwide interoperability for microwave access subscription or session.

In addition, the means for resolving 20251, 20252 of the UPB 2025 may configured to resolve the received network identity-related information (e.g. IMPI, IMPU) based on the provided relation (stored in the memory 20252) to provide a second actual identifier (e.g. WiMAX_ID2) specific e.g. for worldwide interoperability for microwave access.

And, the means for sending 20253 of the UPB 2025 may be configured to send (e.g. to the S-CSCF 2023) the response comprising both the first obtained actual identifier (e.g. WiMAX_ID1) specific e.g. for worldwide interoperability for microwave access and the resolved second actual identifier (e.g. WiMAX_ID2) specific for worldwide interoperability for microwave access.

Without being restricted to the detail following in this section, the modification of the second embodiment of the present invention may be summarized as follows, wherein only statements deviating from the second embodiment are given:

a User Profile Binding (UPB) function
in case of the identifier specific to the WiMAX subscription or session being a temporary (e.g. session-related) or pseudo identity, is able to resolve this identity to the real identity of the subscription or session of this MS or user. Resolution can be performed by the UPB itself, or by interfacing with a common user data repository and authorization server like an AAA server or a HSS.

In addition, the present invention also relates to a system which may comprise the user equipment 201, and the above-described P-CSCF 2021, S-CSCF 2023, ACS 2024 and UPB 2025.

[Further Embodiments]

For the purpose of the present invention as described herein above, it should be noted that an access technology may be any technology by means of which a user equipment can access an access network (or base station, respectively). Although WiMAX is used hereinabove for descriptive purposes (as an example, the WiMAX-specific identifier may be a NAI), any present or future technology, such as WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at the network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices, units or means likely to be implemented as hardware components at the P-CSCF, S-CSCF, ACS and/or UPB, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, units or means (e.g. user equipment and base station) can be implemented as individual devices, units or means, but this does not exclude that they are implemented in a distributed fashion throughout the system, as long as the functionality of the device, unit or means is preserved.

It is to be noted that embodiments described hereinabove show a SIP or IMS Register message as example message where the proposed invention applies. However, the invention applies in the same way to any other SIP or IMS message type.

Also, the invention is not limited to the SIP protocol or the IMS system as specified by 3GPP, 3GPP2, ETSI TISPAN, or other organizations. It can be used identically also for other network or application services that are accessed through a WiMAX network, that have a subscription database similar to the HSS for IMS and a server comparable to the S-CSCF, that is in charge of authorizing the respective control messages sent by the end users/devices. A non-limiting example service would be Instant messaging.

It is also to be noted that the I-CSCF is an optional element in IMS and is not always present (e.g. in a non-roaming case). This, however, does not affect, or impact the present invention. In this case the P-CSCF and S-CSCF would exchange messages directly.

The invention claimed is:

1. A method, comprising:
an apparatus storing a relation of network access technology-specific identification information identifying at least one of a user equipment and a user and network identity-related information of the at least one of the user equipment and the user;
the apparatus receiving an inquiry comprising network identity-related inquiry information;
the apparatus resolving the received network identity-related inquiry information to network access technology-specific identification information based on the provided relation; and
the apparatus sending a response comprising the network access technology-specific identification information according to a result of the resolved network identity-related inquiry information to a first network element to enable the first network element to provide the network access technology-specific identification information to a second network element in order for the second network element to determine whether the at least one of the user equipment and the user is authorized for access depending on whether the network access technology-specific identification information sent by the first network element matches network access technology-specific identification information obtained by the second network element.

2. The method according to claim 1, wherein the network identity-related information and the network identity-related inquiry information respectively comprise an internet protocol address allocated to the user equipment.

3. The method according to claim 1, wherein the network identity-related information and the network identity-related inquiry information respectively comprise an internet protocol multimedia subsystem private identity and an internet protocol multimedia subsystem public identity.

4. A method, comprising:
a first network element receiving a registration request comprising network identity-related inquiry information from at least one of a user equipment and a user;
the first network element obtaining network access technology-specific identification information identifying the at least one of the user equipment and the user based on the received network identity-related inquiry information, the network access technology-specific identification information having been provided by an apparatus as a result of the apparatus having resolved the network access technology-specific identification based on the network identity-related inquiry information;
the first network element appending the received network identity-related inquiry information with the obtained network access technology-specific identification information so as to form appended network identity-related inquiry information; and
the first network element sending the appended network identity-related inquiry information to a second network element in order to determine whether the at least one of the user equipment and the user is authorized for access depending on whether the network access technology-specific identification information sent by the first network element matches network access technology-specific identification information obtained by the second network element.

5. A method, comprising:
a first network element receiving a registration request comprising first network access technology-specific identification information identifying at least one of a user equipment and a user and network identity-related information, the first network access technology-specific identification information having been provided by an apparatus as a result of the apparatus having resolved the first network access technology-specific identification based on network identity-related inquiry information;
the first network element obtaining second network access technology-specific identification information identifying the at least one of the user equipment or and the user based on the received network identity-related inquiry information;
the first network element matching the received first network access technology-specific identification information against the obtained second network access technology-specific identification information; and
the first network element authorizing access for a user equipment based on a result of matching.

6. The method according to claim 5, wherein the received first network identity-related information comprises an internet protocol multimedia subsystem private identity and an internet protocol multimedia subsystem public identity.

7. The method according to claim 1, wherein at least one of first and second the network access-technology-specific identification information comprises an identifier specific for worldwide interoperability for microwave access.

8. The method according to claim 1, wherein the network access-technology-specific identification information comprises one of a temporary and a pseudo identifier specific for a worldwide interoperability for microwave access subscription or session.

9. The method according to claim 5, wherein, in the receiving, the received first network access technology-specific identification information comprises one of a temporary and a pseudo identifier specific for a worldwide interoperability for microwave access subscription or session, the method further comprising: obtaining, as the first network access technology-specific identification information, an actual identifier specific for worldwide interoperability for microwave access based on the received one of a temporary and a pseudo identifier specific for a worldwide interoperability for microwave access subscription or session.

10. The method according to claim 5, wherein, in the receiving, the received first network access technology-specific identification information comprises one of a temporary and a pseudo identifier specific for a worldwide interoperability for microwave access subscription or session, wherein the obtaining is based on the received network identity-related information and the received first network access technology-specific identification information, and obtains, as the first network access technology-specific identification information, a first actual identifier specific for worldwide interoperability for microwave access, and obtains, as the second network access-technology-specific identification information, a second actual identifier specific for worldwide interoperability for microwave access.

11. The method according to claim 3, wherein, in the receiving, the received inquiry comprises both network identity-related information and one of a temporary and a pseudo identifier specific for a worldwide interoperability for microwave access subscription or session, the method further comprising obtaining, from another network element, a first actual identifier specific for worldwide interoperability for microwave access based on the received one of a temporary and a pseudo identifier specific for a worldwide interoperability for microwave access subscription or session, wherein, in the resolving, the received network identity-related information is resolved based on the provided relation to provide a second actual identifier specific for worldwide interoperability for microwave access, and wherein, in the sending, the response comprises both the first obtained actual identifier specific for worldwide interoperability for microwave access and the resolved second actual identifier specific for worldwide interoperability for microwave access.

12. The method according to claim 1, wherein the network access technology-related identification information comprises at least one of a network access identifier, a security parameter index value, and an access, authorization and accounting server identification.

13. The method according to claim 1, wherein the network identity-related information comprises a mobile internet protocol home address.

14. The method according to claim 1, wherein the network identity-related information is a internet protocol address used by the user equipment, the internet protocol address being ensured to be constituted by the internet protocol address correspondingly allocated by a network to the user equipment.

15. An apparatus, comprising: a memory for storing a relation of network access technology-specific identification information identifying a user equipment or user and network identity-related information of the user equipment; a
   receiver for receiving an inquiry comprising network identity-related inquiry information;
   a processor for resolving the received network identity-related inquiry information to network access technology-specific identification information based on the provided relation; and
   a transmitter for sending a response comprising the network access technology-specific identification information according to a result of the resolved network identity-related inquiry information to a first network element to enable the first network element to provide the network access technology-specific identification information to a second network element in order for the second network element to determine whether the at least one of the user equipment and the user is authorized for access depending on whether the network access technology-specific identification information sent by the first network element matches network access technology-specific identification information obtained by the second network element.

16. An apparatus, comprising:
a least one processor; and
at least one memory including computer program code, the at least one memory and the computer program code configured to, with the at least one processor, cause the apparatus to perform at least the following:
receiving a registration request comprising network identity-related inquiry information from at least one of a user equipment and a user;
obtaining network access technology-specific identification information identifying at least one of a user equipment and a user based on the received network identity-related inquiry information, the network access technology-specific identification information having been provided by a first network element as a result of the first network element having resolved the network access technology-specific identification based on the network identity-related inquiry information;
appending the received network identity-related inquiry information with the obtained network access technology-specific identification information so as to form appended network identity-related inquiry information; and
sending the appended network identity-related inquiry information to a second network element in order to determine whether the at least one of the user equipment and the user is authorized for access depending on whether the network access technology-specific identification information sent by the apparatus matches network access technology-specific identification information obtained by the second network element.

17. An apparatus, comprising:
a least one processor; and at least one memory including computer program code, the at least one memory and the computer program code configured to, with the at least one processor, cause the apparatus to perform at least the following:
receiving a registration request comprising first network access technology-specific identification information identifying at least one of a user equipment and a user and network identity-related information the first network access technology-specific identification information having been provided by a first network element as a result of the first network element having resolved the first network access technology-specific identification based on network identity-related inquiry information;
obtaining second network access technology-specific identification information identifying at least one of a user equipment and a user based on the received network identity-related inquiry information;
matching the received first network access technology-specific identification information against the obtained second network access technology-specific identification information; and
authorizing access for a user equipment based on a result of matching.

18. A computer program, embodied on a non-transitory computer readable medium, comprising code for performing methods steps of a method according to claim 1, when run on a computer.

19. A computer program embodied on a non-transitory computer readable medium, product comprising code for performing methods steps of a method according to claim 4, when run on a computer.

20. A computer program. embodied on a non-transitory computer readable medium, comprising code for performing methods steps of a method according to claim 5, when run on a computer.

21. The method according to claim 4, wherein the network access-technology-specific identification information comprises an identifier specific for worldwide interoperability for microwave access.

22. The method according to claim 5, wherein the network access-technology-specific identification information comprises an identifier specific for worldwide interoperability for microwave access.

23. The method according to claim 4, wherein the network access-technology-specific identification information comprises one of a temporary and a pseudo identifier specific for a worldwide interoperability for microwave access subscription or session.

24. The method according to claim 5, wherein the network access-technology-specific identification information comprises one of a temporary and a pseudo identifier specific for a worldwide interoperability for microwave access subscription or session.

25. A method, comprising:
- a first network element receiving a registration request comprising network identity-related inquiry information from at least one of a user equipment and a user;
- the first network element obtaining first network access technology-specific identification information identifying the at least one of the user equipment and the user based on the received network identity-related inquiry information, the network access technology-specific identification information having been provided by an apparatus as a result of the apparatus having resolved the network access technology-specific identification based on the network identity-related inquiry information;
- the first network element modifying the registration request with the obtained first network access technology-specific identification information;
- the first network element sending the modified registration request;
- a second network element obtaining second network access technology-specific identification information identifying the user equipment or user based on the modified registration request;
- the second network element matching the obtained first network access technology-specific identification information against the obtained second network access technology-specific identification information; and
- the second network element authorizing access for the user equipment or user based on a result of matching.

26. A method according to claim 25, wherein the network access technology-specific identification information comprises a worldwide interoperability for microwave access (WiMax) identifier.

27. A method according to claim 1, wherein the network access technology of the user equipment is based on worldwide interoperability for microwave access (WiMAX), the network access technology-specific identification information comprises a WiMax identifier, and the network identity-related inquiry information comprises network identity-related information of the user equipment.

\* \* \* \* \*